(12) United States Patent
Koppen et al.

(10) Patent No.: US 8,720,033 B2
(45) Date of Patent: May 13, 2014

(54) METHOD OF ASSEMBLING A WIPER BLADE

(75) Inventors: Scott Allen Koppen, Wanatah, IN (US);
James Lynn Lytle, Crown Point, IN (US)

(73) Assignee: Federal-Mogul Corporation, Southfield, MI (US)

( * ) Notice: Subject to any disclaimer, the term of this patent is extended or adjusted under 35 U.S.C. 154(b) by 466 days.

(21) Appl. No.: 13/180,618

(22) Filed: Jul. 12, 2011

(65) Prior Publication Data

US 2011/0265309 A1 Nov. 3, 2011

Related U.S. Application Data

(62) Division of application No. 12/124,623, filed on May 21, 2008, now Pat. No. 7,992,248.

(60) Provisional application No. 60/939,510, filed on May 22, 2007.

(51) Int. Cl.
*B23P 11/02* (2006.01)

(52) U.S. Cl.
USPC .................. 29/453; 15/250.32; 15/250.34

(58) Field of Classification Search
CPC ............. B60S 2001/382; B60S 2001/3822; B60S 2001/3836; B60S 2001/3818; B60S 1/38; B60S 1/3801; B29C 47/0023; B29C 47/026; B29L 2031/305
USPC ............................ 29/453, 464; 15/250.32–34
See application file for complete search history.

(56) References Cited

U.S. PATENT DOCUMENTS

| 2,687,544 | A | 8/1954 | Scinta |
| 2,782,444 | A | 2/1957 | Krohm |
| 2,983,945 | A | 5/1961 | De Pew |
| 3,116,507 | A | 1/1964 | Scinta |
| 3,116,510 | A | 1/1964 | Olshei et al. |
| 3,208,091 | A | 9/1965 | Golub et al. |
| 3,372,423 | A | 3/1968 | Anderson |
| 3,541,629 | A | 11/1970 | Quinlan et al. |
| 3,616,485 | A | 11/1971 | Quinlan et al. |
| 3,696,497 | A | 10/1972 | Quinlan et al. |
| 4,063,328 | A | 12/1977 | Arman |

(Continued)

FOREIGN PATENT DOCUMENTS

| DE | 32 22 864 A1 | 12/1983 |
| JP | 60-94854 | 5/1985 |

(Continued)

*Primary Examiner* — David Bryant
*Assistant Examiner* — Moshe Wilensky
(74) *Attorney, Agent, or Firm* — Robert L. Stearns; Dickinson Wright, PLLC

(57) ABSTRACT

A wiper blade assembly has a resilient wiper element with a crown having lengthwise grooves and a tip for wiping a window. An arcuate metal flexor has inner edges disposed in the grooves of the crown and outer edges. An elongate cover has an upper wall and a pair of flanges curled inwardly in spaced relation from the upper wall to provide elongate channels. The outer edges of the flexor are disposed in the channels. The connector is configured for attachment to a wiper arm, and has a lower surface with a pair of flanges curled in spaced relation from the lower surface to provide opposite facing pockets that slidingly receive the cover flanges therein. A projection on one of the connector or the cover is received in an opening of the other of the connector or the cover to lock the connector to the cover.

6 Claims, 7 Drawing Sheets

(56) References Cited

U.S. PATENT DOCUMENTS

| | | |
|---|---|---|
| 4,543,682 A | 10/1985 | Kessler et al. |
| 5,493,750 A | 2/1996 | Bollen et al. |
| 6,026,537 A | 2/2000 | Hojnacki |
| 6,192,546 B1 | 2/2001 | Kotlarski |
| 6,581,237 B1 | 6/2003 | Kotlarski |
| 6,625,842 B1 | 9/2003 | De Block |
| 6,668,419 B1 | 12/2003 | Kotlarski |
| 6,675,434 B1 | 1/2004 | Wilhelm et al. |
| 6,799,348 B1 | 10/2004 | Swanepoel et al. |
| 6,810,556 B1 | 11/2004 | Kotlarski |
| 6,836,926 B1 | 1/2005 | De Block |
| 6,836,927 B2 | 1/2005 | De Block et al. |
| 6,904,639 B2 | 6/2005 | Dietrich et al. |
| 6,966,096 B2 | 11/2005 | Baseotto et al. |
| 6,978,512 B2 | 12/2005 | Dietrich et al. |
| 7,143,463 B2 | 12/2006 | Baseotto et al. |
| 2006/0021178 A1 | 2/2006 | Verelst et al. |

FOREIGN PATENT DOCUMENTS

| | | |
|---|---|---|
| JP | 61-105257 | 5/1986 |
| JP | 10167017 | 6/1998 |
| JP | 2001080471 | 3/2001 |
| JP | 2003534192 | 11/2003 |
| JP | 2004189185 | 7/2004 |
| JP | 2005059644 | 3/2005 |
| JP | 2005521595 | 7/2005 |
| WO | 2007025614 | 3/2007 |

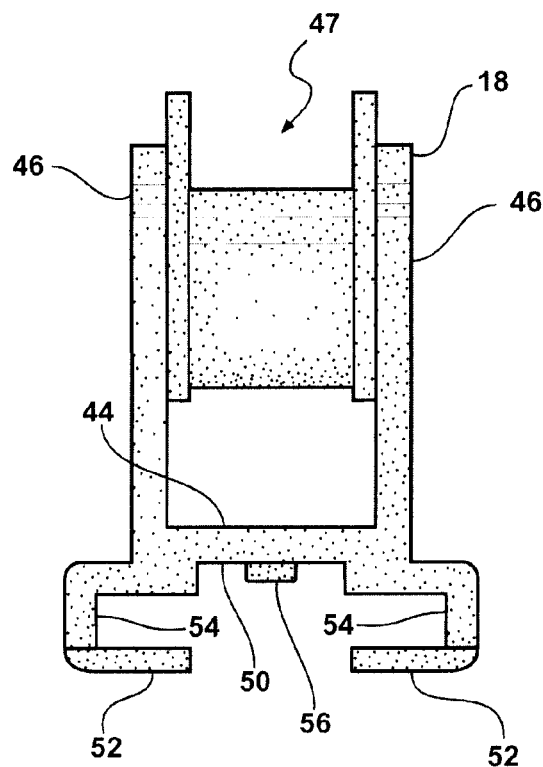
FIG - 7
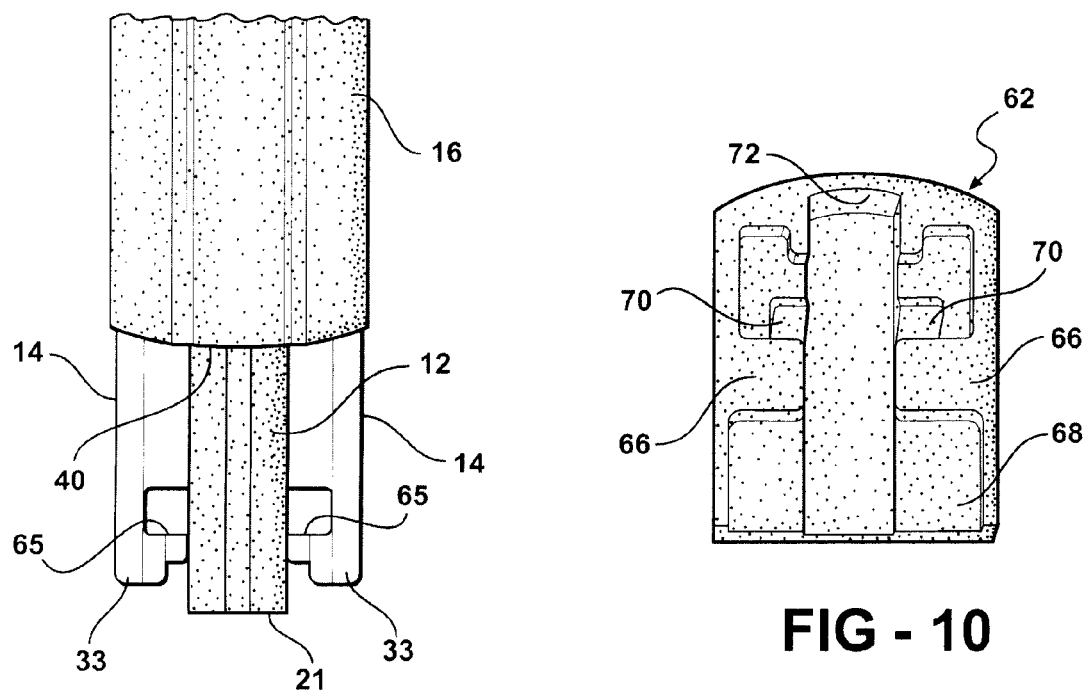
FIG - 9
FIG - 10

METHOD OF ASSEMBLING A WIPER BLADE

CROSS-REFERENCE TO RELATED APPLICATION

This divisional application claims the benefit of U.S. Provisional Application Ser. No. 60/939,510, filed May 22, 2007, and U.S. Utility patent application Ser. No. 12/124,623, filed May 21, 2008, which are incorporated herein by reference in their entirety.

BACKGROUND OF THE INVENTION

1. Technical Field

This invention relates generally to wiper blade assemblies for wiping windows of a vehicle, and more particularly to spoilerless flat wiper blade assemblies.

2. Related Art

Wiper blade assemblies for vehicles are intended to maintain uniform contact with a window across their length while oscillating to prevent unwanted streaking from resulting on the window. Complicating matters is the airflow generated over the wiper blade assembly while the vehicle is moving, and while the wiper blade assembly changes its angle of attack relative to the airflow while oscillating. Further complicating matters is the non-uniform surface of the window, such that the wiper blade needs to be able to flex along it length to change its contour during oscillation. As such, in an effort to best prevent unwanted streaks from occurring, numerous types of wiper assemblies have come about, many of which are complicated to manufacture, and thus, tend to be costly.

One mechanism employed to maintain wiper blade assemblies in uniform contact with the window is to incorporate spoilers on the assemblies. Spoilers are intended to create a desired aerodynamic attack of the wiper blade assembly relative to the airflow over the wiper blade assembly, however, this approach is met with certain challenges. In some cases, the spoiler, rather than creating a uniform pressure distribution over the wiper blade assembly, can create unequal high and low relative pressures along an upper surface of the wiper blade assembly, and thus, portions of the assembly tend to lift from the window, thereby causing streaking and/or noise. Further, the addition of spoilers to the wiper blade assemblies adds cost. As such, the challenges of forming a wiper blade assembly that is both aerodynamic throughout various conditions of use and yet low in cost, both in material and in manufacture, remains.

SUMMARY OF THE INVENTION

A wiper blade assembly constructed in accordance with one presently preferred embodiment of the invention has a resilient wiper element, an elongate flat metal flexor, an elongate polymeric cover, and a connector adapted for attachment to a wiper arm. The wiper element has a crown with longitudinally extending grooves therein and a neck extending from the crown to a body having a tip for engaging a window. The flexor has a predetermined curvature with inwardly facing edges and outwardly facing edges, wherein the inwardly facing edges are releasably disposed in each of the grooves of the wiper element crown. The cover has a substantially flat elongate upper wall extending between opposite ends and a pair of flanges curled inwardly toward one another in spaced relation from the upper wall to provide elongate channels between the flanges and the upper wall, wherein the outwardly facing edges of the flexor are releasably disposed in the channels. The upper wall of the cover has one of an opening or a protrusion between the opposite ends. The connector is adapted for attachment to a wiper arm, and has a lower surface for engagement with the upper wall of the cover. The cover also has a pair of flanges curled toward one another in spaced relation from the lower surface to provide opposite facing pockets that slidingly receive at least a portion of the flanges and the upper wall of the cover therein. The lower surface of the cover has the other of the opening or protrusion, with the respective opening and protrusion being configured to engage one another to lock the connector to the cover.

A wiper blade assembly constructed in accordance with another presently preferred embodiment of the invention has a resilient wiper element, an pair of elongate, arcuate metal flexors, an elongate polymeric cover, and a connector. The wiper element has a crown with longitudinally extending grooves facing opposite one another and a tip for wipingly engaging a window. The flexors have inwardly facing edges and outwardly facing edges extending along their length, wherein the inwardly facing edges are disposed in each of the grooves of the wiper element crown. The cover has a substantially flat elongate upper wall extending between opposite ends with an opening extending through the upper wall. The cover also has a pair of flanges curled inwardly toward one another in spaced relation from the upper wall providing channels between the flanges and the upper wall, wherein the channels receive the inwardly facing edges of the flexors. The connector is adapted for attachment to a wiper arm and has a lower surface for engagement with the upper wall of the cover. The connector also has a pair of flanges curled inwardly toward one another in spaced relation from the lower surface to provide opposite facing pockets slidingly receiving at least a portion of the flanges and the upper wall of the cover therein. The lower surface of the connector has a protrusion depending therefrom, with the protrusion being disposed through the opening in the cover to lock the connector to the cover.

According to yet another aspect of the invention, a method of assembling a wiper blade assembly is provided. The method includes providing a resilient wiper element having a crown with longitudinally extending grooves therein and a tip opposite said crown for engaging a window; providing an elongate, curved flexor have inwardly and outwardly facing edges; providing an elongate polymeric cover having an upper wall with one of an upwardly extending projection or an opening and a pair of flanges curled inwardly toward one another in spaced relation from the upper wall to provide elongate channels between the flanges and the wall, and providing a wiper arm connector having a lower surface with one of a downwardly extending projection or an opening and a pair of flanges curled toward one another in spaced relation from the lower surface to provide a gap between the connector flanges and the lower surface. The method further includes disposing the inwardly facing edges of the flexor in the grooves of the resilient wiper element and disposing the outer edges of the flexor in the channels of the cover. The method further includes sliding the wiper arm connector along the cover to an approximate midpoint thereof with the gaps of the connector receiving a portion of the upper wall and the flanges of the cover and bringing the projection into snapping, locked receipt within the opening to prevent relative movement of the wiper arm connector with the cover.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, wherein the same reference numbers are used to identify similar features, in which:

FIG. 7 is an end view of a wiper arm connector of the wiper blade assembly;

FIG. 9 is a partial plan view of the wiper blade assembly of FIG. 8 with an end cap removed therefrom;

FIG. 10 is a plan view of the underside of the end cap shown removed from the wiper blade assembly of FIG. 8;

DETAILED DESCRIPTION OF PRESENTLY PREFERRED EMBODIMENTS

Figure 1:
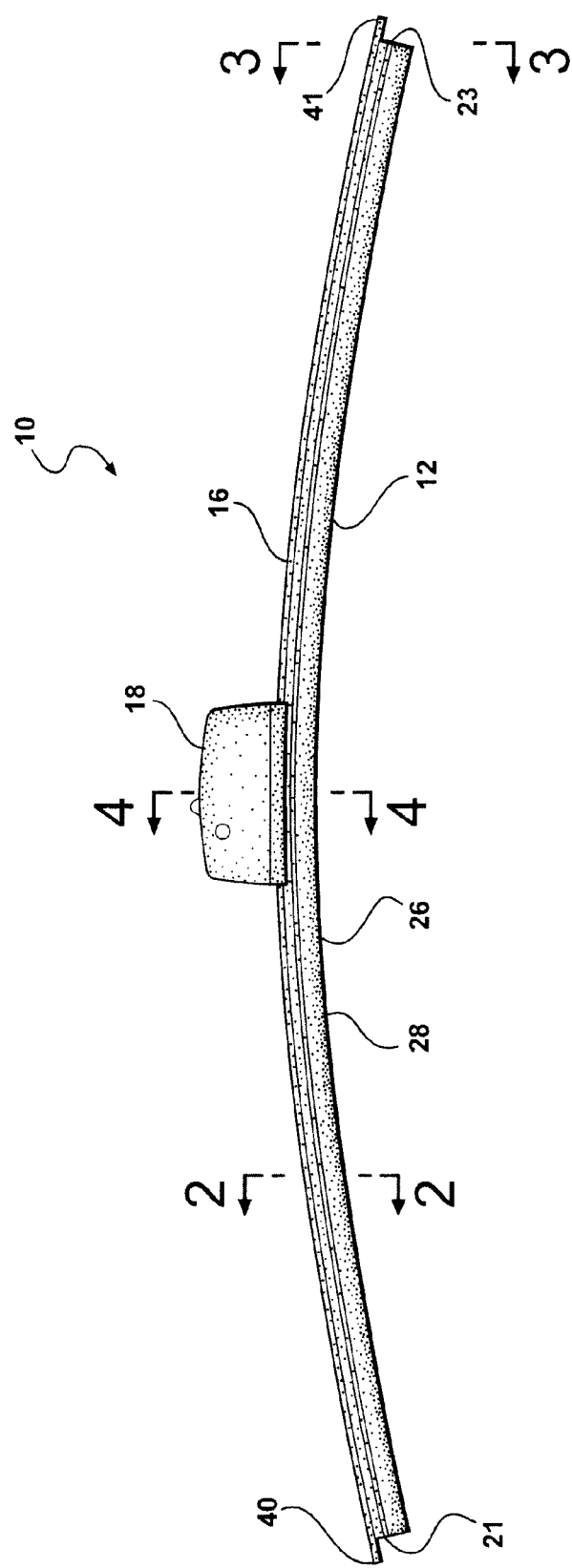
FIG. 1 is a side view of a wiper blade assembly constructed in accordance with one presently preferred embodiment.
Figure 2:
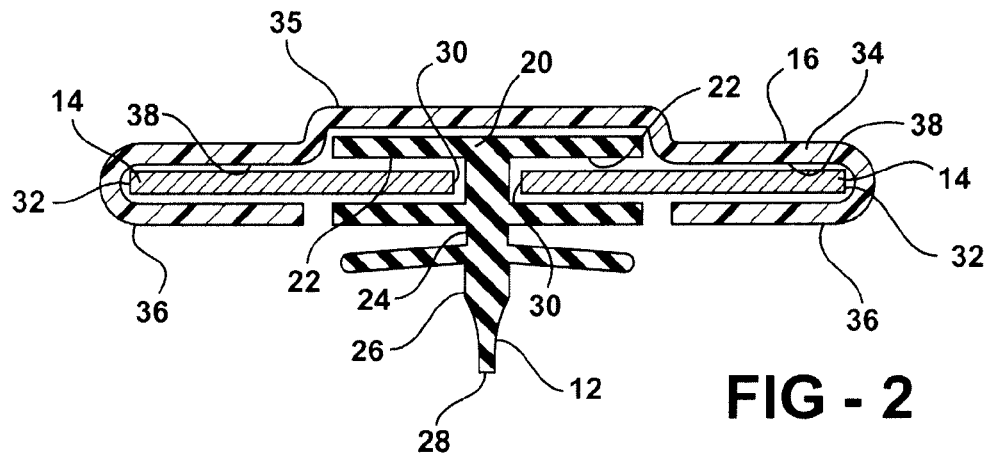
FIG. 2 is a cross-sectional view taken generally along line 2-2 of the wiper blade assembly.

Referring in more detail to the drawings, FIG. 1 illustrates a wiper blade assembly 10 constructed according to one presently preferred embodiment of the invention. The wiper blade assembly 10 has a resilient wiper element 12 that is biased into a substantially uniform contact along its length with a window to be wiped (not shown) by at least one, and shown here as a pair of separate, elongate, substantially flat flexor elements, referred to hereafter as flexors 14 (FIGS. 2-4). The wiper element 12 and flexors 14 are carried by an elongate substantially flat cover 16, preferably constructed from a flexible polymeric material of a suitable thickness, such that the cover 16 remains flexible in use so that it, along with the wiper elements 12, can be freely biased by the flexors 14. The substantially flat contour of the cover 16 promotes the ability of the wiper element 12 to maintain generally equalized contact pressure with the window during oscillation over a wide range of vehicle velocity, and thus, over a wide range of air velocity. A wiper connector 18 is adapted for attachment to the cover 16 without the use of separate fasteners. The connector 18 can be configured for attachment to any wiper arm assembly (not shown), whether having a pin-type connection, hook-end type connection, flat-end type connection, or otherwise.

The polymeric wiper element 12 is fabricated from, for example, rubber, PTFE, or any other suitable wiper element material, as known in the wiper element art, and is shown here, by way of example and without limitations, as being generally standard in form. The wiper element has a crown 20 extending between opposite ends 21, 23 with longitudinally extending grooves 22 opposite one another, extending laterally into the crown 20. A neck 24 depends from the crown 20 to a body 26 that terminates at a tip 28.

Figure 3A:
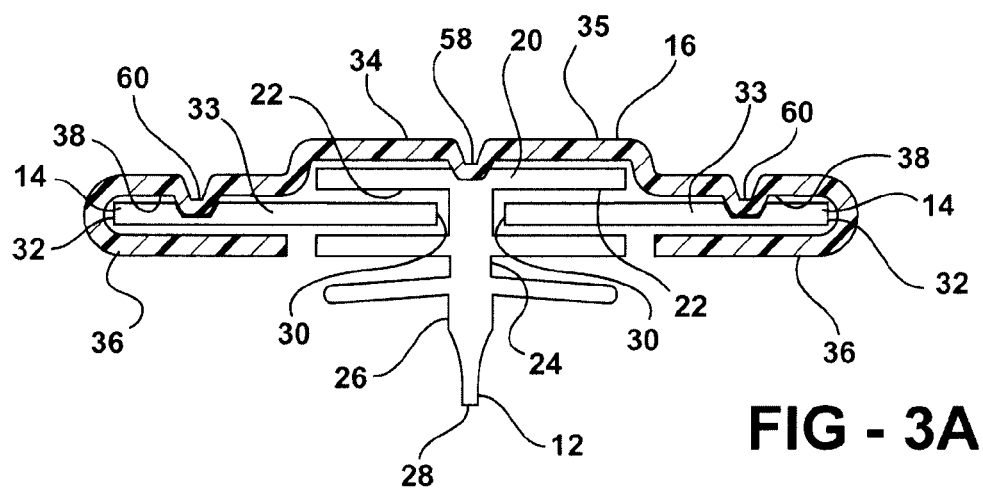
FIG. 3A is a cross sectional view taken generally along line 3-3 of the wiper blade assembly.
Figure 3B:
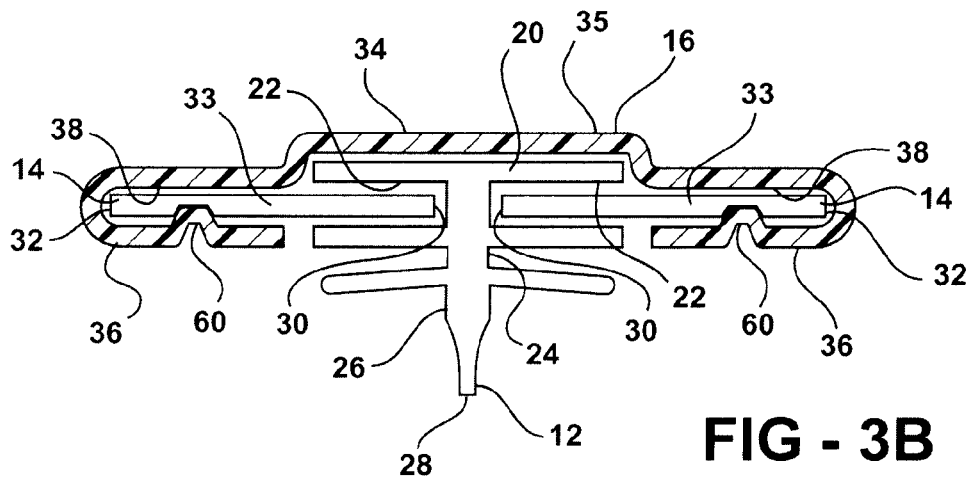
FIG. 3B is a cross sectional view taken generally along line 3-3 of an alternate construction of the wiper blade assembly.

The flexors 14 are fabricated from a resilient metal, such as spring steel, for example. The flexors 14 are formed from separate strips of metal having an arcuate, bowed shape substantially along their length to form the finished bowed shape of the wiper blade assembly, as shown in FIG. 1. It should be recognized that the bowed shape of the flexors 14 can be formed having any predetermined arcuate shape, depending on the contour of the window to be wiped. Generally, the finished radius of curvature of the flexors 14 is smaller than the radius of curvature of the window, such that when the biased, pre-curved wiper blade assembly is brought into contact with the window, the wiper blade assembly applies a uniform pressure to the window along its full length. The flexors 14, as shown in cross-section in FIGS. 2-4, are generally flat and have opposite edges, with one edge being an inwardly facing edge 30 and an opposite edge being an outwardly facing edge 32, extending between opposite ends 33 (FIG. 3A, 3B).

The cover 16 has a substantially flat upper wall 34, shown here as having a slightly bulged or raised mid-portion 35 configured to receive the crown 20 of the wiper element 12, and a pair of flanges 36 curled inwardly from the upper wall 34 toward one another. The flanges 36 are in spaced relation from the upper wall 34 to provide elongate channels 38 between the upper wall 34 and the flanges 36, wherein the channels 38 extend generally between opposite ends 40, 41 of the cover 16. The upper wall 34 has one of a downwardly extending projection or an opening, represented here, for example, as an opening 42 formed therethrough at an approximate midpoint between the opposite ends 40, 41. The opening 42 facilitates assembly of the wiper connector 18 to the cover 16, as discussed hereafter. In manufacture, the cover 16 can be molded or extruded from the desired polymeric material.

Figure 4A:
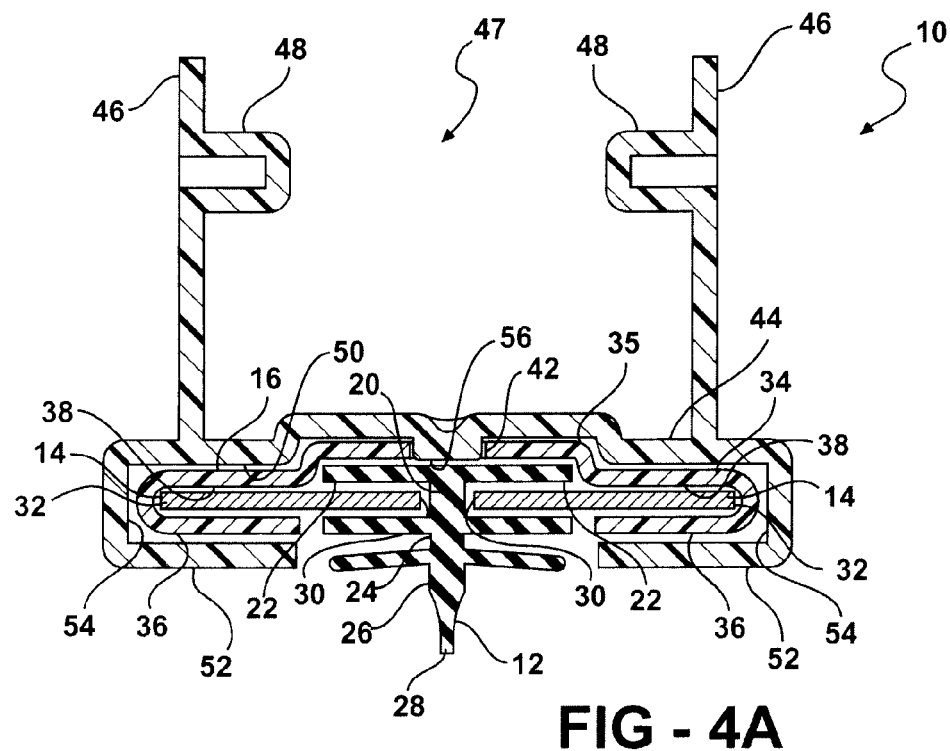
FIG. 4A is a cross-sectional view taken generally along line 4-4 of the wiper blade assembly with a portion of a wiper arm connector constructed in accordance with one presently preferred embodiment.
Figure 4B:
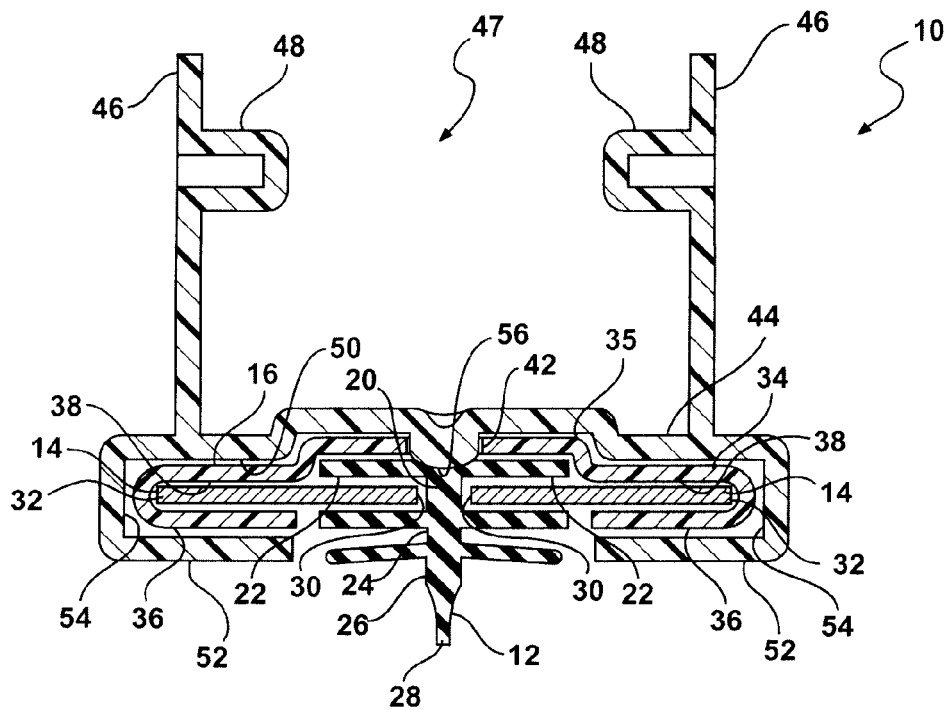
FIG. 4B is a cross-sectional view taken generally along line 4-4 of the wiper blade assembly shown with a portion of a wiper arm connector constructed in accordance with another presently preferred embodiment.
Figure 5:
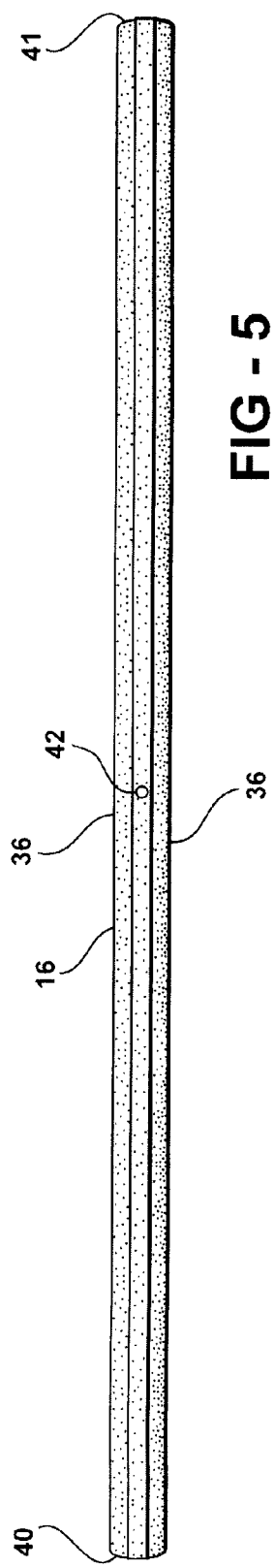
FIG. 5 is a top plan view of a cover of the wiper blade assembly shown in a disassembled state.
Figure 6:
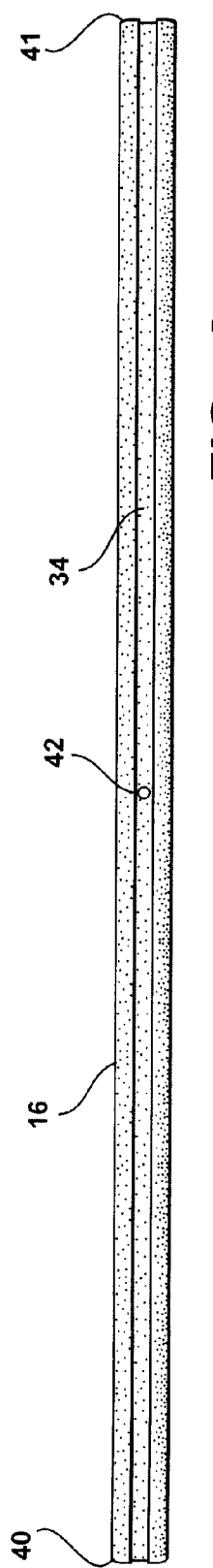
FIG. 6 is a bottom plan view of the cover.

The wiper connector 18 can be provided to enable attachment of one or more types of wiper arms to the assembly 10. The connector 18 can be fabricated from any suitable metal, such as stamped steel, or any suitable polymeric material. As shown in FIGS. 4A-4B and 7, the connector 18 has a lower wall 44 with a pair of laterally spaced sidewalls 46 extending upwardly therefrom to provide a generally open channel 47 therebetween for receipt of an end of the wiper arm. To facilitate connection of the wiper arm to the connector 18, by way of example and without limitation, the sidewalls 46 can have opposite openings therein for receipt of a pin, or the sidewalls 46 can be molded having inwardly extending projections 48 formed as one piece of material with the body of the connector 18. The lower wall 44 has a lower surface 50 that abuts the upper wall 34 of the cover 16 upon assembly. The connector 18 has a pair of flanges 52 curled inwardly from the lower wall 44 toward one another in spaced relation from the lower surface 50 to provide opposite facing pockets 54 sized to receive at least a portion of the flanges 36 and upper wall 34 of the cover 16.

As shown in FIG. 4A, to facilitate assembly and retention of the connector 18 to the cover 16, the connector 18 has one of an opening or a protrusion, and represented here, for example, as a protrusion 56 depending from the lower surface 50 for receipt in the opening 42 of the cover 16. The protrusion 56 is preferably sized for a close snapping fit within the opening 42, such that upon being received therein, the connector 18 is fixed against relative movement with the cover 16, such that separate fasteners are not needed. As shown in FIG. 4B, in addition to fixing the connector 18 to the cover 16, the protrusion 56 can be formed to extend through the opening 42 and beyond the upper wall 34 into engagement with the crown 20 of the wiper element 12 sufficiently to prevent relative sliding movement between the wiper element 12, the cover 16 and the connector 18. As such, upon assembling the connector 18, the wiper element 12, cover 16 and connector 18 are fixed in their relative positions to one another without the need of additional fasteners.

If the connector 18 of FIG. 4A is used, then it becomes necessary to further retain the wiper element 12 from moving relative to the flexors 14 and cover 16. As such, as shown in FIG. 3A, the cover 16 is provided with heat staked protrusions 58. The heat staked protrusions 58 are shown here, by way of example and without limitation, as being formed adjacent the ends 40, 41 in close proximity to the ends 23 of the wiper element 12, thereby presenting an obstruction to the crown 20 of the wiper element 12 to prevent the wiper element 12 from moving along the length of the channels 38. It should be recognized that the protrusions 58 could be formed to extend into engagement with the crown 20 of the wiper element 12 at any position along the upper wall 34, if desired.

If the connector 18 of FIG. 4B is used, then it is unnecessary to use additional, separate fasteners to further retain the wiper element 12 from moving relative to the flexors 14 and cover 16. Rather, the protrusion 56 of the connector 18, as explained above, engages and sufficiently retains the wiper element 12 against relative movement with the flexor 14 and cover 16.

The flexors 14 can be fixed within the assembly by heat staked protrusions 60 in the cover 16. As shown in FIG. 3A, the heat staked protrusions 60 can be formed adjacent the ends 40, 41 in the upper wall 34 of the cover 16. As such, the protrusions 60 extend downwardly into the channels 38 to at least partially obstruct the channels 38 and thus, interfere with the ability of the flexors 14 to move relative to the wiper element 12 and cover 16. Rather than forming the protrusions 60 in the upper wall 34, they can be formed in the flanges 36, such that the protrusions extend upwardly into the channels 38 partially obstruct the channels 38, as shown in FIG. 3B. As such, it becomes possible to construct the wiper blade assembly 10 so that the upper wall 34 of the cover 16 is completely free from indentations formed by heat staking, or otherwise.

Figure 8:
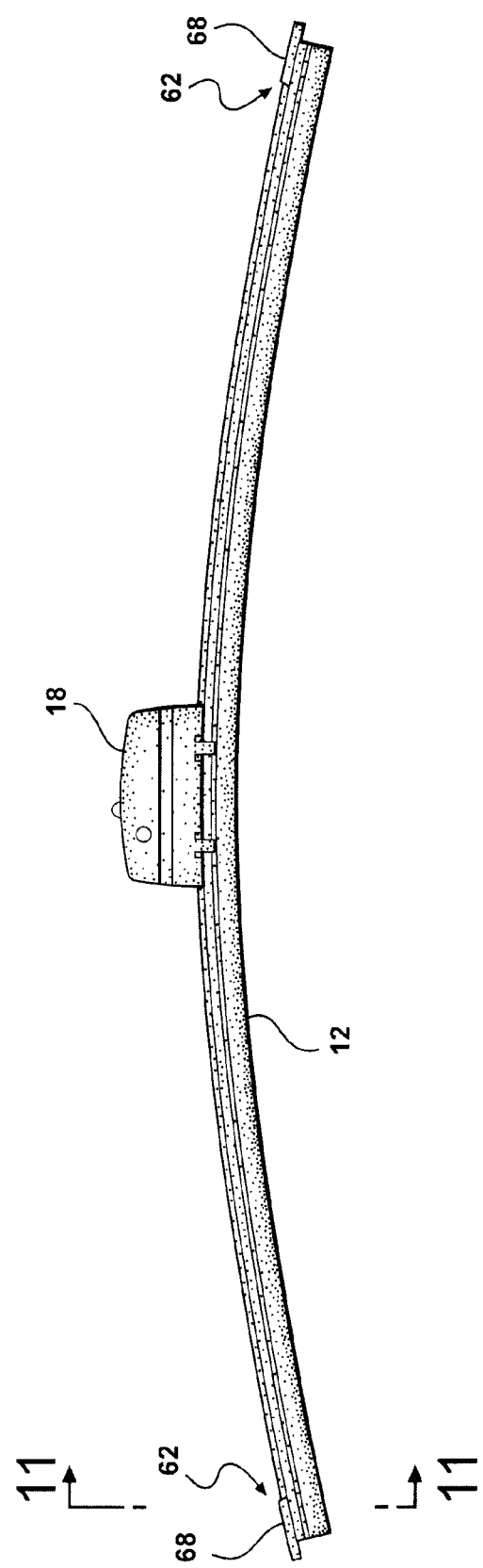
FIG. 8 is a side view of a wiper blade assembly constructed according to another presently preferred embodiment.
Figure 11:
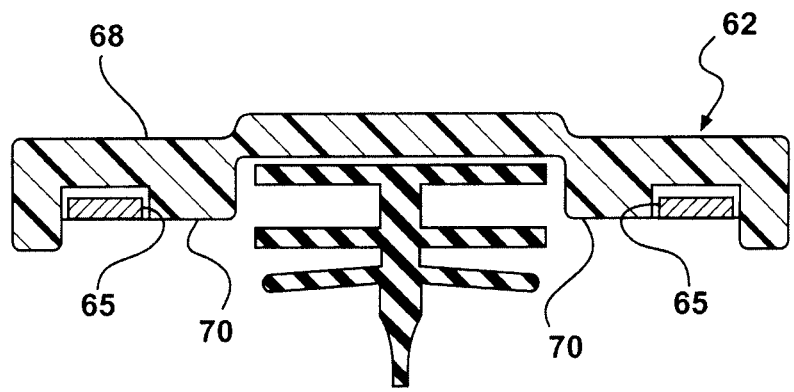
FIG. 11 is a cross-sectional view taken generally along line 11-11 of the wiper blade assembly of FIG. 8.

As discussed above, if the connector 18 of FIG. 4A is used, then it becomes necessary to further retain the wiper element 12 from moving relative to the flexors 14 and cover 16. As such, in yet another presently preferred embodiment, as shown in FIG. 8, end caps 62 are attached to opposite ends of the wiper blade assembly 10 to constrain the wiper element 12, flexors 14 and cover 16 against relative movement with one another.

As shown in FIG. 9, the flexors 14 have opposite ends 33 that extend beyond the ends 40, 41 of the cover 16, with the wiper element 12 extending to a predetermined location adjacent the ends 33. The flexors 14 have notches or openings 65 adjacent their ends 33 for locking engagement with the end caps 62. As shown in FIG. 10, to establish the locking engagement of the end caps 62 with the flexors 14, the end caps 62 have pockets for sliding receipt of the flexors ends 33 therein, wherein the pockets are represented here, by way of example, as being provided by flanges 66 curled toward one another in spaced relation from upper walls 68 of the caps 62. In addition, the caps 62 have tabs 70 extending downwardly from the upper walls 68, wherein the tabs 70 are sized for snapping, locking receipt in the openings 65 of the flexors 14. Upon sliding the end caps 62 onto the flexors 14 and bringing the tabs 70 into snapping, locking receipt in the openings 65, the flanges 66 of the end caps 62 preferably present themselves in close abutment with the ends 40, 41 of the cover 16, while an end wall 72 of the caps 62 confronts the ends 21 of the wiper element 12, thereby preventing relative movement between the wiper element 12, flexors 14 and cover 16.

Figure 12:
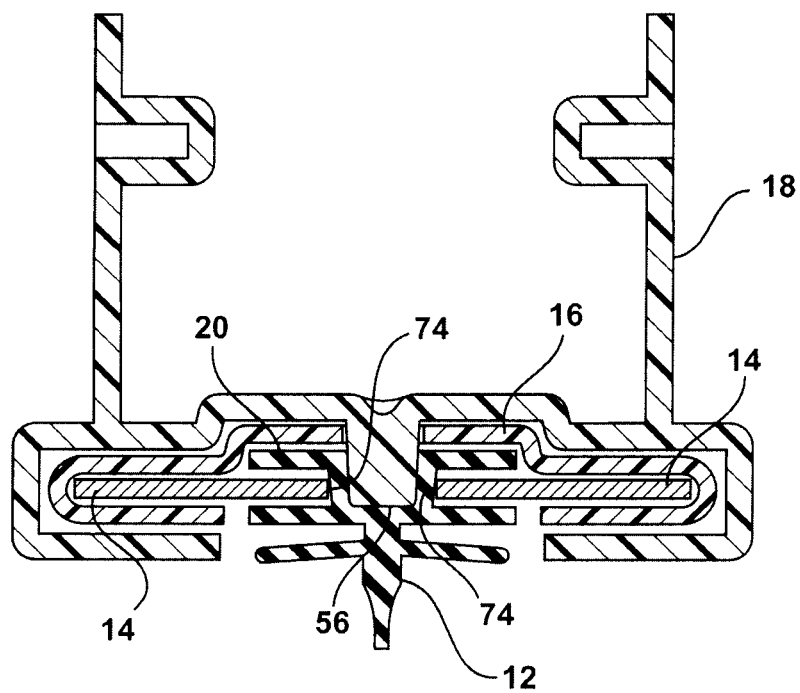
FIG. 12 is a cross-sectional view of the wiper blade assembly similar to FIGS. 4A-4B shown with a portion of a wiper arm connector constructed in accordance with yet another presently preferred embodiment.

In yet another presently preferred embodiment, as shown in FIG. 12, the protrusion 56 of the connector 18 can extend not only into locking engagement with the cover 16 and the crown 20 of the wiper element 12, but it can also extend into locking engagement with the flexors 14. As shown here, by way of example and without limitation, the protrusion 56 extends into an opening provided by recessed indentations or scallops 74 in the flexors 14, thereby preventing the flexors 14 from moving relative to the protrusion 56. As such, upon locking the connector 18 into engagement with the cover 16, the wiper element 12, flexors 14, cover 16 and connector 18 are all locked against relative movement with one another, thereby completing the assembly of the wiper blade assembly 10.

To assemble of the wiper blade assembly 10, the flexors 14 are disposed in the channels 38 of the cover 16, such as by sliding the outwardly facing edges 32 therein. Then, the crown 20 of the wiper element 12 is slid between the inwardly facing edges 30, wherein the inwardly facing edges 30 are received in the grooves 22 of the crown 20. Then the connector 18 can be slid onto and along the cover 16 until the protrusion 56 is received in snapping engagement in the opening 42 of the cover. As discussed above in the presently preferred embodiments, the protrusion 56 can be brought into engagement with the crown 20 of the wiper element 12, thereby locking the wiper element 12 against relative movement with the cover 16. In addition, the protrusion 56 can be brought into locking engagement with the flexors 14, thereby locking the wiper element 12, the flexors 14, the cover 16 and the connector 18 together. In the alternative, the cover 16 can be heat staked to bring the protrusions 58 into obstruction with the wiper element 12 and/or the protrusions 60 into obstruction with the flexors 14. Further yet, the end caps 62 can be snapped onto the ends 64 of the flexors 14, thereby locking the wiper element 12, flexors 14 and cover 16 together.

Many modifications and variations of the present invention are possible in light of the above teachings. It is, therefore, to be understood that within the scope of any allowed claims, the invention may be practiced otherwise than as specifically described.

What is claimed is:

1. A method of assembling a wiper blade assembly, comprising:

providing a resilient wiper element having a crown with longitudinally extending grooves therein and a tip opposite said crown for engaging a window;

providing an elongate, curved flexor have inwardly and outwardly facing edges;

providing an elongate polymeric cover having an upper wall with one of an upwardly extending projection or an opening and the elongate polymeric cover further having a pair of flanges curled inwardly toward one another in spaced relation from the upper wall to provide elongate channels between the flanges and the wall;

providing a wiper arm connector having a lower surface with one of a downwardly extending projection or an opening and the wiper arm connector further having a pair of flanges curled toward one another in spaced relation from the lower surface to provide a gap between the connector flanges and the lower surface;

disposing the inwardly facing edges of the flexor in the grooves of the resilient wiper element;

disposing the outwardly facing edges of the flexor in the channels of the cover; and sliding the wiper arm connector along the cover to an approximate midpoint thereof with the gaps of the connector receiving a portion of the upper wall and the flanges of the cover and bringing the projection into snapping, locked receipt within the opening to prevent relative movement of the wiper arm connector with the cover.

2. The method of claim 1 further including providing the wiper arm connector with the downwardly extending projection and the cover with the opening.

3. The method of claim 2 further including preventing relative movement between the wiper arm connector, the cover and the wiper element by engaging the crown with the projection upon bringing the projection into snapping, locked receipt within the opening.

4. The method of claim 2 further including preventing relative movement between the wiper arm connector, the cover, the wiper element and the flexor by engaging the crown with the projection and bringing a portion of the crown and the projection into receipt within an opening in the flexor upon bringing the projection into snapping, locked receipt within the opening in the cover.

5. The method of claim 2 further including providing an end cap and snappingly engaging the end cap with the flexor to prevent relative movement between the flexor, the wiper element and the cover.

6. The method of claim 2 further including providing the flexor as a pair a separate arcuate, flat metal strips.

* * * * *